Feb. 18, 1936.　　　　　　　　　　M. URY　　　　　　　　　2,031,139
CONTROLLING APPARATUS FOR AUTOMOBILE ENGINES
Filed Dec. 15, 1933　　　　2 Sheets-Sheet 1
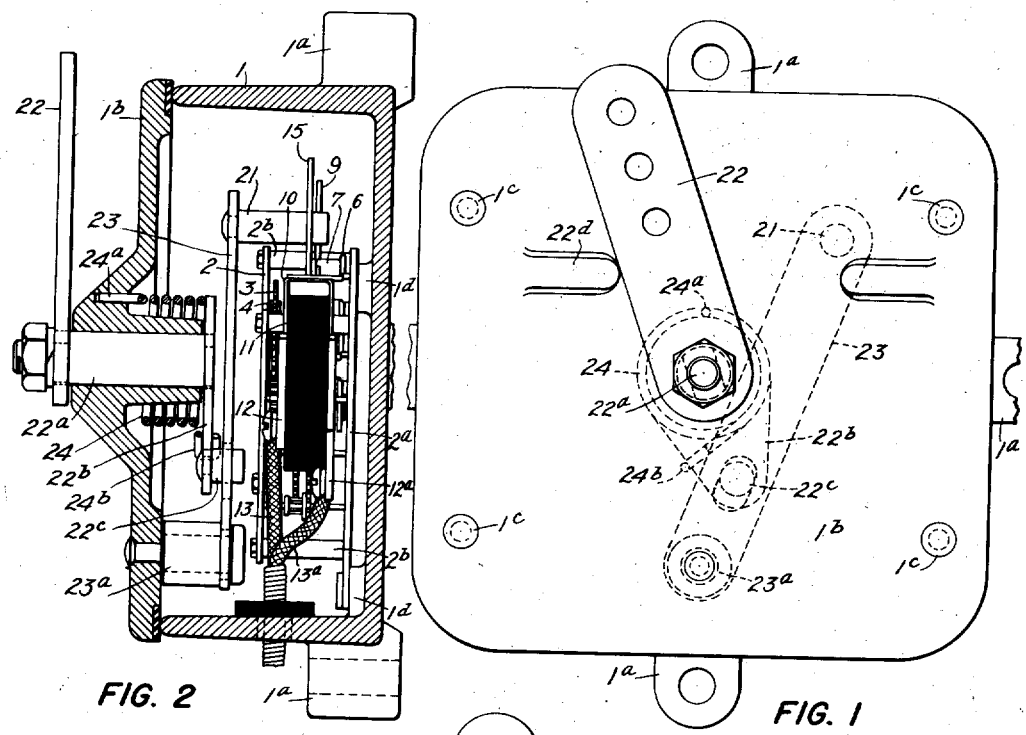
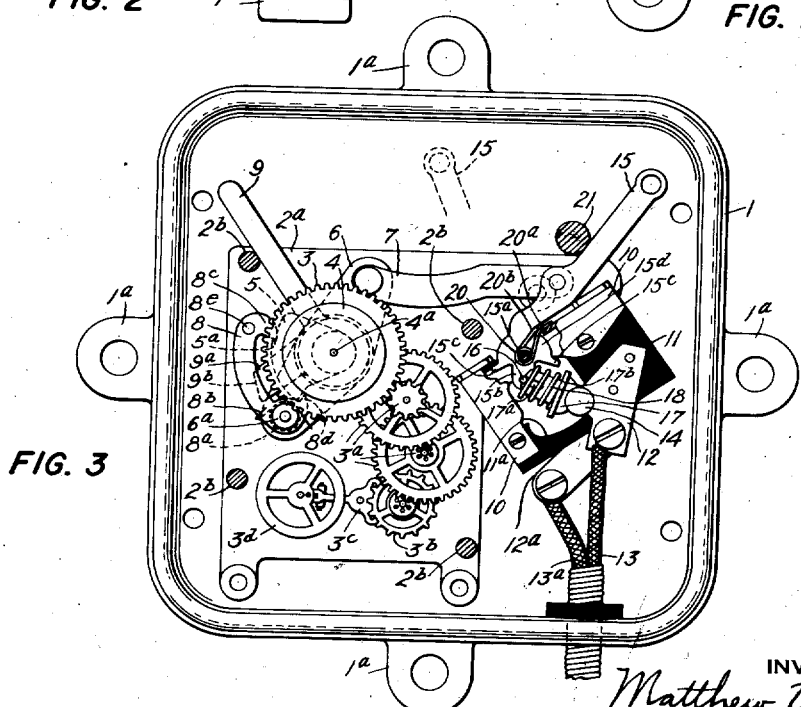
INVENTOR
Matthew Ury
BY
Lawrence K. Sager
his ATTORNEY Feb. 18, 1936.  M. URY  2,031,139
CONTROLLING APPARATUS FOR AUTOMOBILE ENGINES
Filed Dec. 15, 1933  2 Sheets-Sheet 2

INVENTOR
Matthew Ury
BY
Lawrence K. Sager
his ATTORNEY

Patented Feb. 18, 1936

2,031,139

UNITED STATES PATENT OFFICE 2,031,139

CONTROLLING APPARATUS FOR AUTOMOBILE ENGINES

Matthew Ury, Bronx, N. Y.

Application December 15, 1933, Serial No. 702,525

5 Claims. (Cl. 161—1)

This invention particularly relates to automatic controlling apparatus whereby, after a predetermined length of time, the ignition circuit of a motor vehicle engine will be interrupted and stop the engine, after which the controlling apparatus may be reset and permit the engine to be started and run until the occurrence of the condition which will again impose a time limit upon the engine for its operation.

The invention is particularly applicable to the control of trucks where the operators commonly leave the vehicle for delivery of packages, or during loading and unloading of the truck, and permit the engine to run idly for unreasonable periods. The main object of the invention is to economize in the consumption of gasoline or other fuel and to limit the permissible periods of idling of the engine to comparatively short intervals of time sufficient for ordinary purposes and avoid prolonged operation of the engine during unreasonable wasteful periods. A further object is to insure the interruption of the ignition circuit after a predetermined time in case of stalling of the engine and thereby avoid the possible fire and other hazards, or discharge of a battery when the ignition circuit is permitted to remain closed. A further object is to provide controlling apparatus which is of such a dependable character that it may be made inaccessible to the operator of the vehicle and not only fulfill its function properly but also avoid the possibility of the operator tampering with the device or interfering with its proper mode of operation. Another object is to provide a form of controlling apparatus which may be readily installed on various types of vehicles and also of comparatively low cost of manufacture so that the economy obtained in avoiding wasteful consumption of motor fuel is far greater than the cost of making and installing my improved control apparatus. Other objects and advantages of this invention will be understood from the following description and accompanying drawings which illustrate a preferred embodiment of my invention.

Figure 4:
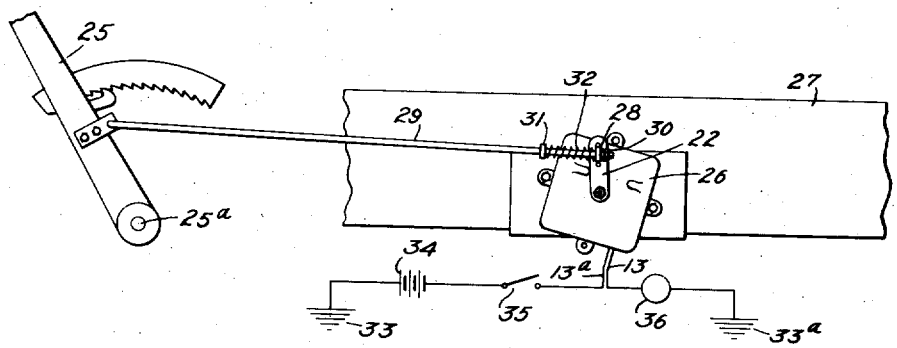
Figure 5:
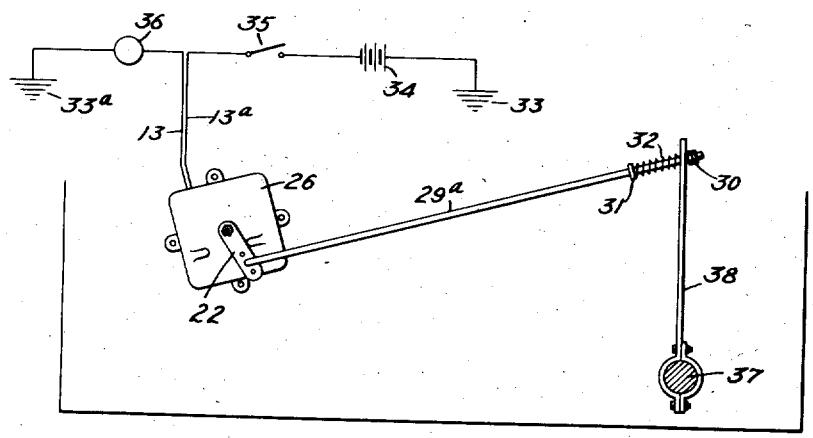

Figure 1 is a plan view of the controlling apparatus. Fig. 2 is a vertical central section of the enclosing casing showing the interior in side elevation. Fig. 3 is a plan view of the controlling mechanism with the top cover and top plate of the clock mechanism removed. Fig. 4 is a diagram indicating one form of installation on an automobile and Fig. 5 is a diagram indicating another form of installation thereof.

Referring to Figs. 1, 2, and 3, the time limit control mechanism is shown as being enclosed in a box having a base 1 with outwardly enclosing sides and extensions 1ª for securing the box in place. A cover 1ᵇ entirely encloses the mechanism, engaging the sides of the base with an intervening gasket of rubber or other material to render the casing waterproof. Rivets 1ᶜ pass through the cover and base and are headed over at the base so as to prevent unauthorized access to the mechanism.

The timing device is in the form of a clock mechanism which is controlled as to its initiation of the predetermined time limit and also its winding by the operator of the automobile in a manner to be hereinafter explained. The clock mechanism is mounted between two plates 2 and 2ª, the latter being secured to the base 1 and mounted on the bosses 1ᵈ. The plates 2 and 2ª are spaced apart and supported by posts 2ᵇ. The clock train comprises the gear train of the usual type and is shown and made up of the power initiating gear 3, the intermediate gears 3ª, the escapement wheel 3ᵇ, the pivoted escapement element 3ᶜ and the balance wheel 3ᵈ and the usual balance wheel spring not shown in the drawings. The power gear 3 is engaged on opposite sides by friction discs 4 concentric with the gear 3, the gear 3 being loosely mounted on the shaft 4ª. The friction discs 4 are fixed to the shaft 4ª as is also the outwardly extending segment 5 shown in Fig. 3 and spaced below the gear 3 and friction discs 4. Pivotally mounted on the shaft 4ª and below the segment 5 is a lever 6, one end of which is moved by a link 7 and the opposite end of which carries fixed thereto an upwardly extending post 6ª. On the upper end of this post and opposite to the segment 5 is pivotally mounted a double ended hook element 8, the hook ends of which are adapted to engage and control the movement of the segment 5. The element 8 is mounted at one of its ends on the post 6ª and a spring 8ª is fixed at one end and coiled around the post 6ª and engages the element 8 at its outer edge as shown at 8ᵇ and thereby tends to keep the hook 8ᶜ, at one end of the element 8, in engagement with the periphery of the segment 5 and at times to engage an abutment 5ª in its periphery for the purpose of actuating the shaft 4ª, the friction discs 4 and gear 3 and thereby operate the gear train. The other hooked end 8ᵈ of the element 8 also projects inwardly towards the segment 5 and engages the edge at the other end of the segment 5 so that when the lever 6 is moved in a clockwise direction, looking at Fig. 3, the hook 8ᵈ will engage the segment 5 and turn it together with the shaft 4ª and friction discs 4 in a clockwise direction, but the gear wheel 3, during this movement, will remain stationary, by reason of the frictional engagement therewith of the discs 4 and the fact that the clock train will prevent turning of the gear 3. On the shaft 4ᵃ is also pivotally mounted a manually adjustable arm 9 which has another arm 9ᵃ extending outwardly towards the hooked element 8. The arm 9ᵃ has an outer periphery 9ᵇ which is adapted to be engaged by a pin 8ᵉ extending downwardly from one end of the element 8. When the clock mechanism is actuated by the hook 8ᶜ engaging the segment 5 and the parts, including the gear 3, are turning in a counterclockwise direction with the axis of the shaft 4ᵃ as a center, the pin 8ᵉ will gradually approach the periphery 9ᵇ and ultimately engage the same which will cause the hook 8ᶜ to be forced outwardly and disengage the abutment 5ᵃ of the segment 5 and thereby terminate the actuation of the clock mechanism and permit free movement of the hook 8 and its actuating lever 6 about the shaft 4ᵃ and thereby also permit actuation of the switch controlling the ignition circuit of the engine. It is evident that by manual adjustment of the arm 9, this tripping device or tripping mechanism may be preset to cause the ignition circuit to be interrupted after any desired time interval; because the more the arm 9 is moved in a clockwise direction, the nearer the arm 9ᵃ will be caused to approach the pin 8ᵉ and, therefore, a shorter interval of time will be utilized in the pin 8ᵉ reaching the arm 9ᵃ and thereby releasing the mechanism than would be the case if the arm 9 were adjusted to the position shown in Fig. 3 where the arm is at a maximum distance from the pin 8ᵉ, the post 2ᵇ serving as a stop for maximum adjustment of the arm 9 in one direction.

The switch control mechanism is mounted on the plate 2ᵃ at one side of the clock mechanism and comprises a sheet metal plate 10 bent in the form of a U and serves as the supporting frame for the switch mechanism, this frame being supported upon and fixed to the plate 2ᵃ. Clamped between the sides of the frame 10 is a block of insulating material 11. On the upper face of this block is secured a metal plate 12 which serves as a fixed contact of the switch and has connected thereto the outgoing lead 13 of the ignition circuit. On the lower face of the block 11 is correspondingly located another contact plate from which an arm 12ᵃ extends which in turn is connected to the other lead 13ᵃ of the ignition circuit. These leads unite to form an armored cable which passes out through a side of the box 1 through a protective rubber bushing for preventing entrance of moisture. The spaced contact plates 12 have a curved portion 12ᵇ at their inner edges to permit engagement thereof by a crossconnecting roller 14 which is located in a center space between the portions of the insulating block 11 and the frame 10. The roller 14 is movable from the position shown in Fig. 3 where the circuit is closed to the left for breaking the ignition circuit. The switch is actuated by movement of the arm 15 which latter is pivotally mounted on a shaft 15ᵃ fixed between the sides of the frame 10, a portion of this frame being broken away in Fig. 3 for more clearly showing the switch control mechanism. The arm 15 has a projecting portion 15ᵇ which carries a cross-pin 16 at its outer end. A tumbler element 17 serves as a connecting means between the lever 15 and the contact roller 14 for actuating the roller 14 and rapidly snap the same to close or open the ignition circuit. This tumbler at one end pivotally engages the roller 14, or a reduced central portion thereof, and at the other end is provided with a slot 17ᵃ engaged by the pin 16, the slotted end of the tumbler 17 being bifurcated to extend over opposite sides of the arm 15ᵇ and to engage the pin 16 at opposite sides thereof. The tumbler 17 is also provided with a flange 17ᵇ at the contact end; and between this flange and the pin 16 is located a coiled spring 18. This spring serves to exert continuous pressure of the tumbler element 17 against the roller 14 and to throw the switch to open or closed position quickly whenever the pin 16 is swung, by movement of the lever 15, to a position beyond a line connecting the center of the roller 14 and the axis of the shaft 15ᵃ. Thus, if the arm 15 be moved to the left, the pin 16 will be forced to the right and pass somewhat within the slot 17ᵃ, compressing the spring 18 and when the pin passes a line between the centers of the shaft 15ᵃ and the roller 14, the spring 18 will cause the contact roller 14 to be thrown out of engagement with the contact plates and be forced to the left to an open contact position, by passing along an interior surface 11ᵃ of the insulating block 11. Similarly, if the arm 15 be then moved in the opposite direction, it will, at a certain position thereof, cause the contact roller 14 to be snapped back to its closed position, as shown in Fig. 3. The arm 15 is provided with projections 15ᶜ which serve as stops to limit the movement thereof by engagement with the base of the frame 10.

The link 7 which is pivotally connected to one end of the lever 6 is pivotally connected at its other end to the arm 15, as shown in Fig. 3. Around the shaft 15ᵃ and on opposite sides of the lever 15 is wound a spring 20, the outer ends 20ᵃ of which engage the base of the frame 10, as shown in Fig. 3. The middle portion 20ᵇ of the spring is looped over a portion 15ᵈ of the arm 15 and this loop presses against the lever 15 and always tends to force the same in a counterclockwise direction. Thus the lever 15 is always biased by spring 20 in a direction to operate the clock train for opening the ignition switch.

It will now be understood that when the arm 15 is forced by a pin 21 to the position shown in Fig. 3, from the dotted line position indicated in Fig. 3, the movement of the link 7 to the right will cause the lever 6 to turn in a clockwise direction; and this in turn by reason of the hook 8ᵈ engaging the segment 5 will turn the shaft 4ᵃ and the friction discs 4 in a clockwise direction, the gear 3 remaining stationary. At the same time, the switch, by movement of the arm 15, has caused the roller contact 14 to be moved from its open position to the closed position, as shown in Fig. 3. As long as the pin 21 is pressed against the arm 15, it counteracts spring 20 and the switch remains closed and the ignition circuit in the engine is not interfered with because the arm 15 is then causing the friction discs 4 to be held against any counterclockwise movement. As soon as the pin 21 is moved away from the arm 15, the spring 20 is released and becomes active in moving the arm 15 to the left. This in turn causes the hook 8ᶜ to engage the abutment 5ᵃ of the segment 5 and through the discs 4 applies power to the gear 3 to start the clock mechanism. As this mechanism operates under the actuating force of the spring 20, the gear 3 is permitted to turn slowly in a counterclockwise direction and the link 7 and arm 15 gradually move to the left. At the end of a predetermined time limit, as determined by the adjusted position of the arm 9, the pin 8ᶜ is caused to ride up upon the arm 9ᵃ and the hook 8ᶜ is released, or tripped, as already explained. The spring 20 then acts to throw the arm 15 quickly to the left, by reason of its being relieved from engagement with the clock mechanism and this causes the switch in the ignition circuit to be quickly snapped to open position, as already explained. The arm 15 is by this action thrown to the dotted position indicated in Fig. 3, the pin 21 not then being in its path. When the pin 21 is brought to bear against the arm 15 again, the latter is moved to the right against the pressure of the spring 20. In this movement the switch element 14 is snapped to its closed position and the parts controlling the clock train are restored in position ready to actuate the clock train, as already explained. The parts will remain in the position shown in Fig. 3 until the pin 21 releases the arm 15 and permits the clock mechanism to start on its predetermined limit of travel after which the contact element 14 will be snapped to its open position, as already explained.

The movement of the pin 21 is controlled by a to and fro movement of the arm 22 which is exterior to the casing enclosing the mechanism. This arm is fixedly connected to the outer end of a pin 22ᵃ which is mounted in and rotatable in the center of the cover 1ᵇ. At the inner end of the pin 22ᵃ is fixed an arm 22ᵇ extending radially from the axis of the pin 22ᵃ and carries at its outer end a downwardly projecting pin 22ᶜ. The pin 22ᶜ extends downwardly into a slot in another arm 23 which is pivotally supported at one end by a bolt 23ᵃ fixed on the inner face of the cover 1ᵇ. The other end of the arm 23 carries fixed thereto the pin 21 which pin has already been described with reference to Fig. 3. As shown in Fig. 2, the pin 21 extends from the arm 23 downwardly into the path of the arm 15. When the external arm 22 is moved to the left against the abutment 22ᵈ on the cover, as shown in Fig. 1, the pin 21, through the leverage system already described, is moved to the right so that the pin 21 will occupy the position shown in Fig. 3 and insure closure of the ignition circuit for initial operation of the vehicle. Any movement of the arm 22 from the position shown in Fig. 1, towards the right, causes the pin 21 to move away from the arm 15 and permit the starting of the clock mechanism. It is evident that the leverage mechanism between the arm 22 and the pin 21, as already described, secures a considerable movement of the pin 21 when the lever 22 is moved a comparatively small amount, thus permitting free movement of the arm 15 to snap the switch open at the end of a predetermined time interval.

Referring to Figs. 1 and 2, a spring 24 encircles the inner central hub of the cover 1ᵇ and has one end 24ᵃ fixed in a hole in the cover and the other end 24ᵇ looped over the arm 22ᵇ. This spring exerts a force against the arm 22ᵇ tending to turn it in a counterclockwise direction and thereby throws, in case of breakage of any connection to the arm 22, the arm 23 to the position indicated in Fig. 1. This causes the pin 21 to occupy the position shown in Fig. 3 and thus insures the closure of the ignition circuit for initial operation of the vehicle in case of breakage of the rod or other part controlling the movement of the lever 22.

The position occupied by the arm 22 obviously controls the action of the control mechanism. Thus, as long as the lever 22 is in the position shown in Fig. 1, the clock mechanism is inactive and the ignition circuit is not interfered with because the roller contact 14 is in closed position. Initial operation of the vehicle is thus permitted. If, however, the lever 22 be moved from the position shown in Fig. 1, the clock mechanism immediately starts measuring a predetermined time interval and, unless the arm 22 is restored to its initial position within that time interval, the ignition circuit will be interrupted and the engine automatically stopped. In the latter event, the ignition circuit can be again closed and the engine again started only by first restoring the arm 22 to its initial position. Thus, there is afforded a means for automatically controlling the operation of the engine which is dependent upon the position for a movable element such as the arm 22. In my preferred embodiment of this invention, the arm 22 is connected and related to the emergency brake lever of the vehicle in such a way that when the emergency brake lever is in the off position, the relationship of the parts is such that the arm 22 is in the position shown in Fig. 1 and the pin 21 is in the position shown in Fig. 3. Normal operation of the vehicle is then permitted. But when the vehicle is stopped and the emergency brake applied, the movement of the brake lever will cause the arm 22 to be moved to the right and thus permit initiation of the operation of the timing mechanism. Unless the operator returns to the car and releases the emergency brake within the predetermined time interval for which the mechanism is set, the ignition circuit will be automatically interrupted and the engine will stop. A typical installation is indicated in Fig. 4 where the emergency brake handle 25 is shown pivoted on the support 25ᵃ. The control mechanism 26, already described, is shown mounted upon a side piece 27 of the chassis. The arm 22 of the control mechanism is shown as carrying a perforated extension 28 through which a rod 29 freely passes. One end of the rod is connected to the emergency brake lever as shown. At the other end of the rod are adjustable nuts 30 which cause the arm 22 to be moved to the position shown in Fig. 1 when the brake lever 25 is moved to its off position. Between the projection 28 and a ring 31 fixed to the rod 29 is a coiled spring 32 of sufficient power so that a small movement of the brake lever 25 toward the on position will cause the arm 22 to be actuated to initiate the operation of the timing mechanism. Any further movement of the emergency brake lever beyond the permissible movement of the arm 22 will cause compression of the spring 32 and thus permit full movement of the emergency brake lever without undue straining of the parts. The ignition circuit is indicated in a general way in Fig. 4 by the ground 33, the battery 34, the manual cowl-board switch 35, the coil distributor and spark plug circuits as indicated by the circle 36 and also the other ground connection 33ᵃ. The automatic control switch, already described, is inserted in series in the ignition circuit as indicated by the leads 13 and 13ᵃ in Fig. 4 which correspond to the same leads indicated in Fig. 3.

Another form of installation is indicated in Fig. 5 wherein the control mechanism instead of being operated directly by the emergency brake lever, is controlled by the rotation of the usual brake cross rod 37. In this instance a pair of straps are clamped about the rod 37 and firmly fixed in place thereon, one of the straps having a lever 38 extending upwardly to be engaged by the rod 29ª which has one end connected to the lever 22 of the box mechanism and the other end yieldably connected with the rod 38 in the manner already described.

It is evident that the emergency brake control mechanism may be connected to my improved control mechanism in various other ways and that the same is readily adapted to be conveniently mounted upon any part of the vehicle and conveniently connected for operation. The control box is preferably mounted under the body of the vehicle on the chassis or in such convenient location as to be accessible with difficulty to the operator of the vehicle. This tends to prevent the operator from tampering with the mechanism or interfering with its normal operation. As above described, in case of breakage of the rod 29 or 29ª, or any other connecting part, the spring 24 will cause the control mechanism to be automatically thrown to the position shown in Fig. 3 and thus insure the operator convenient return of the vehicle to its station, where the defect may be easily repaired.

Although I have described a preferred embodiment of this invention, it will be understood that various modifications and adaptations thereof may be made without departing from the scope of the invention. Although I have described and shown the control of the mechanism as being dependent upon the position of the emergency brake of the vehicle, the control may be exercised by other means which will appropriately fulfill the requirements.

I claim:

1. The combination with a motor vehicle having an ignition circuit, of a device for interrupting the ignition circuit comprising a clock mechanism, a switch in said circuit controlled by said mechanism after a predetermined time of operation of said mechanism, a lever biased under spring pressure in a direction for actuating said clock mechanism, and a movable element controlled by the operator of the vehicle and connected with said lever for counteracting said spring pressure during normal operation of the vehicle and for releasing said spring pressure when the vehicle is not in operation.

2. The combination with a motor vehicle having an ignition circuit, of a device for interrupting the ignition circuit comprising a clock mechanism, a switch in said circuit controlled by said mechanism after a predetermined time of operation of said mechanism, a lever for placing said clock mechanism under spring pressure, and means connecting said lever and emergency brake of the vehicle for counteracting said spring pressure when said brake is off and for releasing said spring pressure when said brake is on.

3. The combination with a motor vehicle having an ignition circuit, a device biased to automatically interrupt said ignition circuit after a predetermined time, means controlled by the user of the vehicle for counteracting and for releasing said device, and a protective device for insuring the closure of said circuit upon the breakage of any part of said means.

4. The combination with a motor vehicle having an ignition circuit, of a device for interrupting the ignition circuit comprising a clock mechanism, a switch in said circuit controlled by said mechanism after a predetermined time of operation of said mechanism, a lever biased under spring pressure in a direction for actuating said clock mechanism, a movable element controlled by the operator of the vehicle and connected with said lever for counteracting said spring pressure during normal operation of the vehicle and for releasing said spring pressure when the vehicle is not in operation, and a protective device for counteracting said spring pressure upon failure of control of said lever by said movable element.

5. The combination with a motor vehicle having an ignition circuit, a switch in said circuit, a spring biasing said switch to move it to open position, time controlled mechanism for delaying the opening of said switch after said spring is released, and means controlled by the user of the vehicle in the normal operation thereof for releasing said spring for delayed opening of said switch and for counteracting said spring for securing non-delayed closure of said switch.

MATTHEW URY.